(12) United States Patent
Swierkocki

(10) Patent No.: US 12,070,930 B2
(45) Date of Patent: Aug. 27, 2024

(54) MATERIAL FOR INFLATABLE SAFETY PRODUCTS WITH HIGH STRENGTH TO WEIGHT RATIO

(71) Applicant: Air Cruisers Company, LLC, Wall Township, NJ (US)

(72) Inventor: Thomas W. Swierkocki, Manasquan, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 0 days.

(21) Appl. No.: 18/086,913

(22) Filed: Dec. 22, 2022

(65) Prior Publication Data
US 2024/0208176 A1    Jun. 27, 2024

(51) Int. Cl.
*B32B 5/02* (2006.01)
*B32B 3/30* (2006.01)
(Continued)

(52) U.S. Cl.
CPC .............. *B32B 5/02* (2013.01); *B32B 3/30* (2013.01); *B32B 15/085* (2013.01); *B32B 15/088* (2013.01); *B32B 15/09* (2013.01); *B32B 15/14* (2013.01); *B32B 15/18* (2013.01); *B32B 15/20* (2013.01); *B32B 27/32* (2013.01); *B32B 27/34* (2013.01); *B32B 27/36* (2013.01); *B32B 2307/306* (2013.01); *B32B 2307/54* (2013.01); *B32B 2307/5825* (2013.01); *B32B 2307/718* (2013.01); *B32B 2419/00* (2013.01); *B32B 2439/46* (2013.01); *B32B 2471/00* (2013.01); *B32B 2571/00* (2013.01); *B32B 2607/00* (2013.01)

(58) Field of Classification Search
CPC ......... B32B 5/024; B32B 15/14; B32B 27/32; B32B 27/34; B32B 27/36; B32B 27/02; D03D 15/00; D03D 15/283
See application file for complete search history.

(56) References Cited

U.S. PATENT DOCUMENTS

| 3,974,989 A | 8/1976 | Goodfellow |
| 4,582,734 A | 4/1986 | Miller |

(Continued)

FOREIGN PATENT DOCUMENTS

| JP | 07277275 A | 10/1995 |
| WO | 2019006542 A1 | 1/2019 |
| WO | 2022039814 A2 | 2/2022 |

OTHER PUBLICATIONS

Hall et al., Prototype Design and Testing of a Venus Long Duration, High Altitude Balloon, Advances in Space Research, vol. 42, No. 10, Nov. 17, 2008, pp. 1648-1655.

(Continued)

*Primary Examiner* — Zachary M Davis
(74) *Attorney, Agent, or Firm* — Kilpatrick Townsend & Stockton LLP

(57) ABSTRACT

An inflatable safety product may include a fabric or flexible composite material. The fabric or flexible composite material includes a low weight, high strength substrate. In certain embodiments, the fabric or flexible composite material has a tensile strength of at least 190 lbs/in and/or a tear strength of at least 13 lbs/in and/or a radiant heat resistance of at least 180 seconds, and a substrate weight of less than or equal to 3 ounces/yd$^2$.

16 Claims, 4 Drawing Sheets

(51) Int. Cl.
*B32B 15/085* (2006.01)
*B32B 15/088* (2006.01)
*B32B 15/09* (2006.01)
*B32B 15/14* (2006.01)
*B32B 15/18* (2006.01)
*B32B 15/20* (2006.01)
*B32B 27/32* (2006.01)
*B32B 27/34* (2006.01)
*B32B 27/36* (2006.01)

(56) References Cited

U.S. PATENT DOCUMENTS

| | | | | |
|---|---|---|---|---|
| 4,654,098 | A | * | 3/1987 | Miller ............. B64D 25/14 428/920 |
| 6,951,685 | B1 | * | 10/2005 | Weedon ........... B29C 55/065 428/394 |
| 9,527,249 | B1 | | 12/2016 | Duggal et al. |
| 2018/0327940 | A1 | * | 11/2018 | Hunt .............. D03D 15/46 |
| 2022/0242547 | A1 | * | 8/2022 | Frey .............. B64B 1/40 |

OTHER PUBLICATIONS

International Application No. PCT/US2023/084684, International Search Report and Written Opinion mailed on Jun. 3, 2024, 16 pages.

\* cited by examiner

MATERIAL FOR INFLATABLE SAFETY PRODUCTS WITH HIGH STRENGTH TO WEIGHT RATIO

FIELD OF THE INVENTION

The field of the invention relates to air-holding and component or accessory fabrics or flexible composite materials, and, more particularly, to fabrics or flexible composite materials for an inflatable safety product.

BACKGROUND

Federal aviation safety regulations require aircraft to provide evacuation and other safety provisions for passengers. These include evacuation slides, evacuation slide/rafts, ramps, slide/ramps, life rafts, life vests, helicopter floats and other life-saving inflatable devices. Relevant inflatable products that can be improved using the fabrics or flexible composite materials of the present disclosure can include evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air-holding functions or gas-holding functions. These inflatable devices are generally built from an assembly of inflatable tubular structures that form air beams that are sealed to one another. Inflatable escape slides and life rafts also have non-air-holding features, such as floors, sliding surfaces, girts, patches, handles, pouches, containers, structural attachments, accessories, components, and other features.

Typically, in order to form the tubular structures, many pieces of fabric or flexible composite materials (which also may be referred to herein as panels) are joined together. Safety regulations set strength requirements for the fabric or flexible composite material itself (the field of the inflatable tube), as well as strength requirements for the seam areas. In order to keep the inflation gas inside the tubes for long durations, the seams may be sealed together (e.g., via thermal welding methods) to make them substantially leak proof.

However, the panels and/or the substrates can be heavy, which can make inflating safety provisions difficult and can increase the weight of a passenger vehicle on which the safety provisions are stored. Additionally, merely changing the substrate or panel material to reduce the weight may cause the safety provisions to no longer conform to various regulations, as set forth by the Federal Aviation Administration (FAA).

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a fabric or flexible composite material for an inflatable safety product includes a low weight, high strength substrate with a tensile strength of at least 190 lbs/in and a tear strength of at least 13 lbs/in and a substrate weight of 3 ounces/yd$^2$ or less.

According to certain embodiments of the present invention, a fabric or flexible composite material for an inflatable safety product includes a low weight, high strength substrate comprising a tensile strength of at least 190 lbs/in and a substrate weight of 3 ounces/yd$^2$ or less.

According to certain embodiments of the present invention, a fabric or flexible composite material for an inflatable safety product includes a low weight, high strength substrate comprising a tear strength of at least 13 lbs/in and a substrate weight of 3 ounces/yd$^2$ or less.

According to certain embodiments of the present invention, a fabric or flexible composite material for an inflatable safety product includes a low weight, high strength substrate comprising a substrate weight of 3 ounces/yd$^2$ or less.

According to certain embodiments of the present invention, A fabric or flexible composite material for an inflatable safety product has a substrate weight of less than or equal to 3 ounces/yd$^2$ and a radiant heat resistance of at least 180 seconds, when exposed to radiant heat flux of 1.5 Btu/ft$^2$-sec or greater, for at least 180 seconds.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

Figure 1:
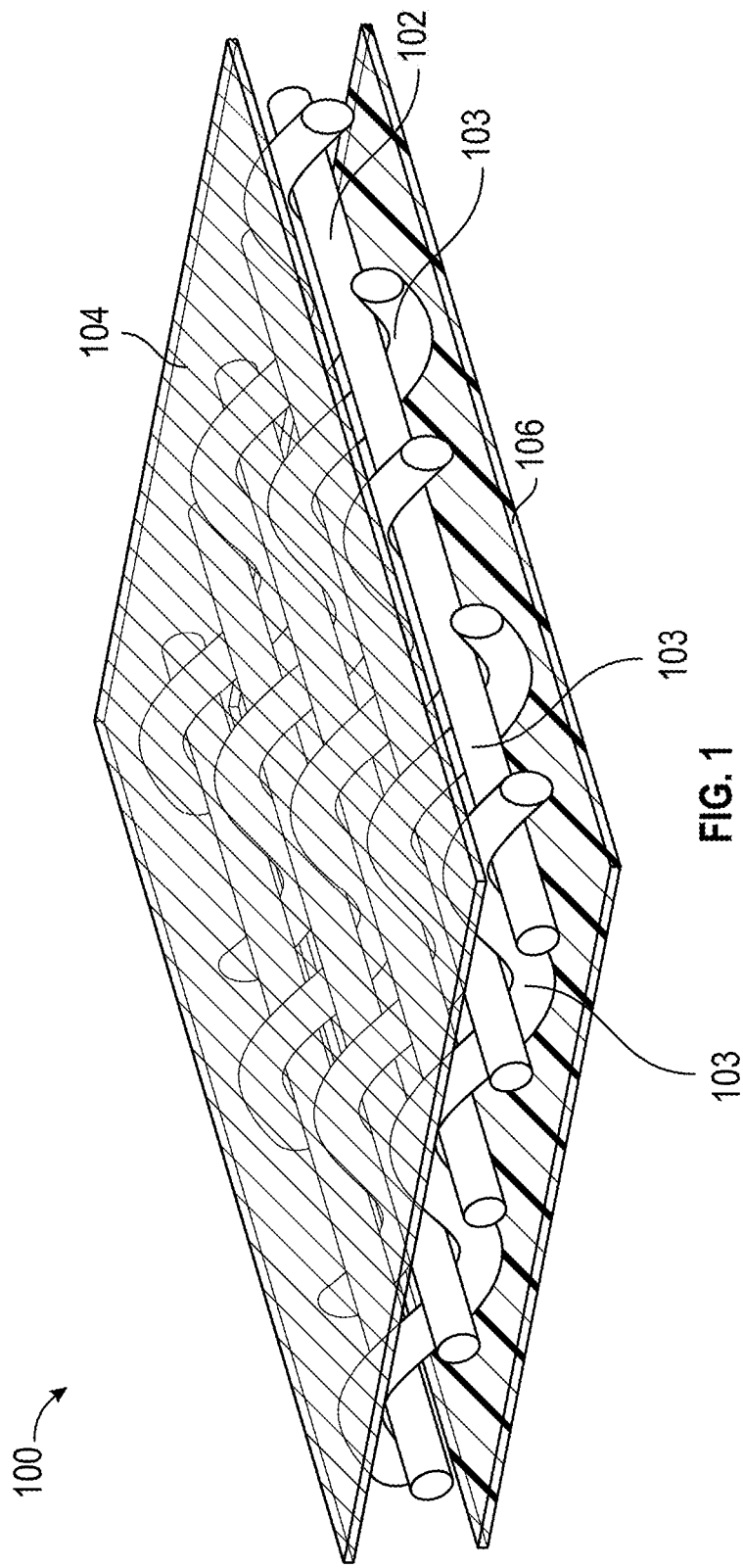
FIG. 1 is a cross-sectional view of a fabric or flexible composite material for an inflatable safety product according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein are fabrics or flexible composite materials for an inflatable safety product and that include a low weight, high strength substrate. While the fabrics or flexible composite materials are discussed for use with inflatable safety products such as but not limited to evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety devices, they are by no means so limited. Rather, embodiments of the fabrics or flexible composite materials may be used in fabric or flexible composite materials related applications of any type of inflatable safety product or otherwise as desired.

Inflatable safety products such as inflatable evacuation slides, slide/rafts, ramps, and slide/ramps, life rafts, life vests, and helicopter floats, among others, traditionally utilize a fabric with a polyamide substrate such as Nylon 6,6 and thermoplastic polyurethane coatings. The thermoplastic polyurethane coatings are applied to the polyamide substrate to provide a weldable or bonding surface, abrasion resistance, fungus resistance, heat and/or flame resistance, and gas barrier properties, among other required functionality.

As a non-limiting example, fabrics or flexible composite materials must have gas barriers with a helium permeability of less than or equal to 10 liters per square meter in 24 hours at 77° F. for inflatable evacuation slides, slide/rafts, ramps, slide/ramps, life rafts, and helicopter floats and a helium permeability of less than or equal to 5 liters per square meter in 24 hours at 77° F. for inflatable life vests.

In order to meet these and other existing coated fabric or flexible composite material performance requirements of tensile strength (i.e., a minimum of 190 lbs/in) and tear strength (i.e., a minimum of 13 lbs/in), current fabrics utilize generally heavy polyamide substrates having a minimum average weight of 4.5 ounces/yd$^2$ and a yarn tenacity of 6.5 to 8.8 grams/denier.

In addition to meeting strength requirements, fabrics or flexible composite materials utilized on inflatable evacuation slides, inflatable slide/rafts, inflatable ramps, inflatable slide/ramps, among others, must meet radiant resistance performance requirements (e.g., at least 180 seconds, when exposed to radiant heat flux of 1.5 Btu/ft$^2$-sec or greater, for at least 180 seconds). While traditional polyamide substrates have a relatively high melting point (e.g., about 514° F.) making them suitable for exposure to radiant heat during a fire, to provide further radiant heat resistance to meet such performance requirements, traditional fabrics or flexible composite materials rely on the thermoplastic polyurethane coating which includes dispersed aluminum particles. Such thermoplastic polyurethane coatings add additional weight, and thus the fabrics or flexible composite materials utilizing such heavy polyamide substrates and thermoplastic polyurethane coatings take up weight on vehicles with weight restrictions such as aircraft that could otherwise be used for other purposes.

Other types of materials that may have a lower weight have traditionally been avoided due to lower melting temperatures of such materials and low strengths of such materials (i.e., they are unable to meet strength requirements). As such, the fabrics or flexible composite materials would melt even with the thermoplastic polyurethane coating with dispersed aluminum particles. As an example, polyethylene substrates such as but not limited to ultra-high molecular weight polyethylene (UHMWPE) have been avoided for inflatable safety products due to a significantly lower melting point (about 297° F.) compared to polyamide substrates, Described herein are fabric or flexible composite materials for an inflatable safety product with a low weight, high strength substrate having a substrate weight of 3 ounces/yd$^2$ or less, such as a substrate weight of 2 ounces/yd$^2$ or less, such as a substrate weight of 1 ounce/yd$^2$ or less, such as a substrate weight of 0.5 ounces/yd$^2$ or less. In certain embodiments, the fabric or flexible composite materials with the low weight, high strength substrates described herein may have a minimum tensile strength of at least 190 lbs/in (hereinafter "minimum tensile strength") and/or a minimum tear strength of at least 13 lbs/in (hereinafter "minimum tear strength"). The fabric or flexible composite materials with the low weight, high strength substrates described herein may have a radiant heat resistance of at least 180 seconds when exposed to a radiant heat flux of 1.5 Btu/ft$^2$-sec or greater (hereinafter "radiant heat resistance"). In certain embodiments, the fabric or flexible composite materials with the low weight, high strength substrates described herein have a weight of less than or equal to 8 ounces/yd$^2$, such as less than or equal to 6 ounces/yd$^2$, such as less than or equal to 5 ounces/yd$^2$, such as less than or equal to 4 ounces/yd$^2$, such as less than or equal to 3 ounces/yd$^2$, such as less than or equal to 2 ounces/yd$^2$, such as less than or equal to 1 ounce/yd$^2$, such as less than or equal to 0.5 ounces/yd$^2$, while maintaining the minimum tensile strength and/or the minimum tear strength and/or the radiant heat resistance.

Non-limiting examples of low weight, high strength substrates may include a polyethylene (PE), UHMWPE, polypropylene (PP), polyester, polyamide (PA), aromatic polyamide, aramid, polyolefin, aromatic polyester, polyarylate, other liquid crystal polymers, or nylon. As a non-limiting example, a polyethylene substrate such as but not limited to an UHMWPE substrate may be utilized as the low weight, high strength substrate.

Optionally, the fabric or flexible composite materials with the low weight, high strength substrates described herein include an emissivity of less than or equal to 0.48, such as less than or equal to 0.25. An emissivity of 0 would mean that the fabric or flexible composite material reflects all heat, and a temperature of the fabric or flexible composite material would not significantly change when exposed to radiant heat. Conversely, an emissivity of 1 would mean that the fabric or flexible composite material is a perfect absorber, and all the heat would be absorbed.

In various embodiments, the fabric or flexible composite materials described herein optionally include a metallic layer covering at least one surface of the low weight, high strength substrate. When included, the metallic layer on the low weight, high strength substrate may provide the emissivity of less than or equal to 0.48, such as less than or equal to 0.25. Applying a metallic layer to the at least one surface may limit the temperature of the fabric or flexible composite material and gas barrier when exposed to radiant heat to maintain tensile strength, seam adhesion, seam shear, and gas barrier properties. In other words, the lower emissivity of less than or equal to 0.48, such as less than or equal to 0.25, may reflect more and/or most of the heat compared to traditional thermoplastic coatings, thereby limiting the temperature of the fabric or flexible composite material and gas barrier. Limiting the temperature may maintain the mechanical, tensile strength, seam adhesion, seam shear, and air and/or gas holding properties of the fabric or flexible composite material described herein when exposed to radiant heat during an aircraft fire. Such improved (lower) emissivity in turn allows for lighter weight substrates to be utilized, thereby providing weight savings.

As such, the fabric or flexible composite materials described herein provide weight savings while maintaining the performance requirements to allow for such fabric or flexible composite materials to be used for inflatable safety products, such as but not limited to an inflatable evacuation slide, inflatable evacuation slide/raft, inflatable evacuation ramp, inflatable evacuation slide/ramp, life raft, helicopter float, and/or life vest, among others.

Inflatable safety products are typically deflated, folded, and compressed to fit into confined areas on aircraft doors, within an aircraft fuselage, or in an aircraft storage compartment, thereby taking up space or volume on vehicles with volume restrictions such as aircraft. The fabric or flexible composite materials described herein with low weight, high strength substrates simplify the folding process and improve the stowage capability of inflatable safety products.

Various other advantages and benefits may be realized with the systems and methods described herein, and the aforementioned benefits should not be considered limiting.

FIG. 1 illustrates an example of a fabric or flexible composite material 100 for an inflatable safety product and that includes a low weight, high strength substrate 102 according to embodiments of the disclosure. The fabric or flexible composite material 100 may be provided as different portions or types of inflatable safety products, optionally with different functionalities. As non-limiting examples, the fabric or flexible composite material 100 may include or be an air- or gas-holding fabric or flexible composite material, a floor fabric or flexible composite material, a sliding surface fabric or flexible composite material, a girt fabric or flexible composite material, a patch fabric or flexible composite material, an accessory fabric or flexible composite material, a component fabric or flexible composite material, a seam tape fabric or flexible composite material, or the like. Non-limiting examples of inflatable safety products with the fabric or flexible composite material 100 include, but are not limited to, an inflatable evacuation slide, inflatable slide/raft, inflatable ramp, inflatable slide/ramp, inflatable life raft, helicopter float, and/or inflatable life vest, among others.

The low weight, high strength substrate 102 may include fibers, filaments, threads, yarns, or tows 103 of various low weight, high strength materials or combinations of materials as desired. As non-limiting examples, the low weight, high strength substrate 102 may include fibers, filaments, threads, yarns, or tows 103 of PE, UHMWPE, PP, polyester, PA, aromatic polyamide, aramid, polyolefin, aromatic polyester, polyarylate, other liquid crystal polymers, or nylon, other suitable substrate material, and/or any combination thereof. As additional non-limiting examples, the low weight, high strength substrate 102 may be fibers, filaments, threads, yarns, or tows 103 with a material such as but not limited to those sold under the trade names Dyneema®, Spectra®, Innegra®, Vectran®, Technora®, Kevlar®, Nylon-6, Nylon 6-6. In a further non-limiting example, the low weight, high strength substrate 102 may include fibers, filaments, threads, yarns, or tows 103 such as PE, UHMWPE, PP, polyester, PA, aromatic polyamide, aramid, polyolefin, aromatic polyester, polyarylate, other liquid crystal polymers, or nylon fibers, filaments, threads, yarns, or tows. In a further non-limiting example, the low weight, high strength substrate 102 may include UHMWPE fibers, filaments, threads, yarns, or tows made up of long chains of polyethylene aligned in a same direction.

In certain embodiments, low weight, high strength substrate 102 may include fibers, filaments, threads, yarns, or tows 103 with a tenacity greater than 8.8 grams/denier, such as a tenacity of greater or equal to 15 grams/denier, such as a tenacity of greater or equal to 20 grams/denier, such as a tenacity of greater or equal to 25 grams/denier, such as a tenacity of greater or equal to 30 grams/denier, such as a tenacity of greater or equal to 35 grams/denier, such as a tenacity of greater or equal to 40 grams/denier, such as a tenacity of greater or equal to 48 grams/denier. In some non-limiting examples, the tenacity may be from about 25 grams/denier to about 45 grams/denier, such as about 30 grams/denier to about 40 grams/denier. Traditionally substrates with a strength to weight ratio or specific strength, herein referred to as tenacity, has a value typically expressed in grams of strength per mass in grams of 9000 meters, herein referred to as denier, which is a measure of linear density, of fibers, filaments, threads, yarns or tows used to manufacture panels, gas-holding fabrics, seam tapes, floor, sliding surface, girt, patch, handle, pouch, container, structural attachment, accessory, component, or other materials or components.

In various embodiments, the low weight, high strength substrate 102 is a material having a weight less than that of a polyamide substrate, such as a material having a weight less than approximately 4.5 ounces/yd$^2$, such as a weight less than approximately 3 ounces/yd$^2$, such as a weight less than approximately 2 ounces/yd$^2$, such as a weight of approximately 1 ounce/yd$^2$, such as a weight of approximately 0.5 ounces/yd$^2$. Optionally, the low weight, high strength substrate 102 is a material having a melting temperature less than that of a polyamide substrate. As non-limiting examples, the material forming the fibers of the low weight, high strength substrate 102 may have a melting temperature less than 500° F., such as a melting temperature less than or equal to 450° F., such as a melting temperature less than or equal to 400° F., such as a melting temperature less than 350° F., such a melting temperature less than 300° F. In one non-limiting example, the low weight, high strength substrate 102 is a PE substrate, such as but not limited to an UHMWPE substrate.

In certain embodiments, the fabric or flexible composite material 100 with the low weight, high strength substrate 102 may have a weight of less than or approximately 8 ounces/yd$^2$. In some embodiments, the weight of the fabric or flexible composite material 100 is less than or approximately 6 ounces/yd$^2$. In some embodiments, the weight of the fabric or flexible composite material 100 is less than or approximately 4 ounces/yd$^2$. In some embodiments, the weight of the fabric or flexible composite material 100 is less than or approximately 3 ounces/yd$^2$. In some embodiments, the weight of the fabric or flexible composite material 100 is less than or approximately 2 ounces/yd$^2$. In various embodiments, the weight of the fabric or flexible composite material 100 is less than or approximately 1 ounce/yd$^2$. In some embodiments, the weight of the fabric or flexible composite material 100 is less than or approximately 0.5 ounces/yd$^2$.

Optionally, and as illustrated in FIG. 1, the low weight, high strength substrate 102 may define opposing surfaces (e.g., an inner surface and an outer surface), and one or more layers of material may be provided on the low weight, high strength substrate 102, either directly or indirectly on the inner surface and/or the outer surface. Such additional layers may include, but are not limited to, a metallic layer 104, an adhesive layer, a coating, a film layer, and/or an inner layer 106. A layer may include acrylic, nylon, polyolefin, modified polyolefin, polyurethane, vinyl, PE, PP, PA, fluoropolymer, polyethylene terephthalate (PET), polystyrene, ethylene vinyl acetate (EVOH), polyvinylidene chloride (PVDC), polycarbonate (PC), polyvinyl chloride (PVC), polylactic acid (PLA), polyvinyl alcohol (PVOH), ethylene-chlorotrifluoroethylene, polyetherketone (PEK), polyetheretherketone (PEEK), polyetherketoneketone (PEKK), or any combination thereof, or any appropriate materials.

Figure 2:
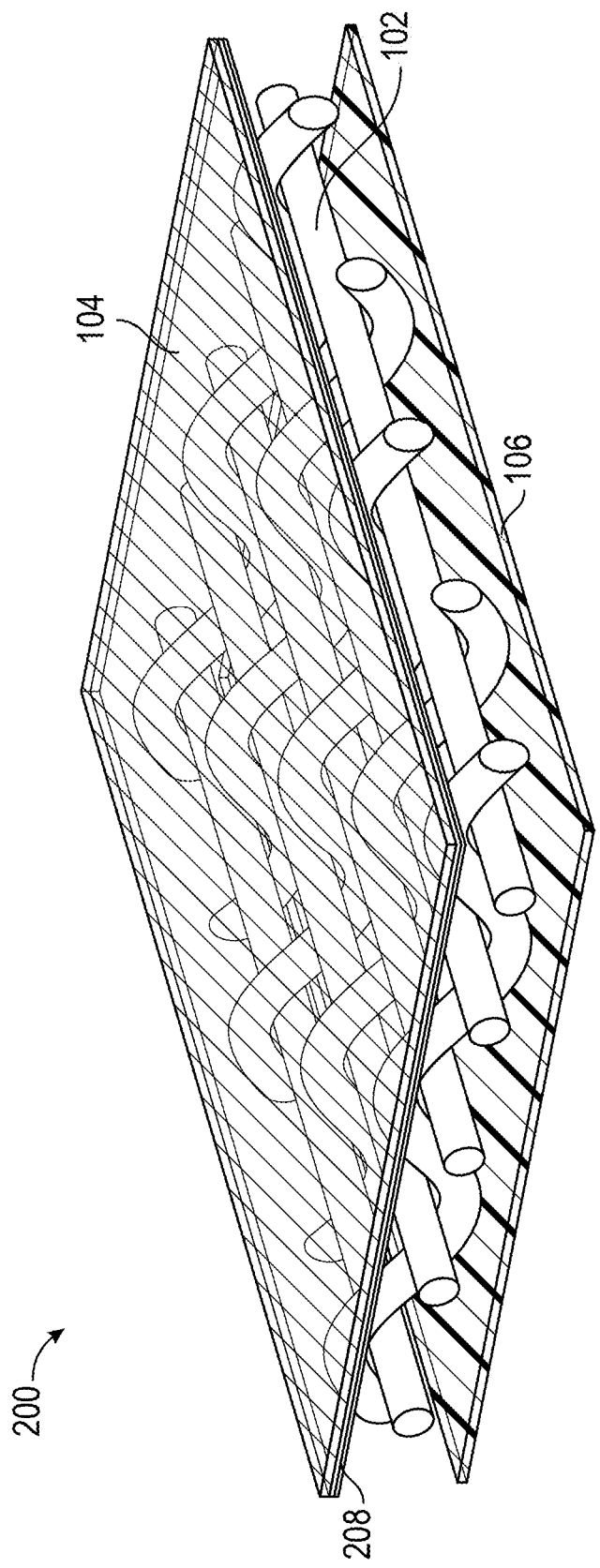
FIG. 2 is a cross-sectional view of a fabric or flexible composite material for an inflatable safety product according to certain embodiments of the present invention.
Figure 3:
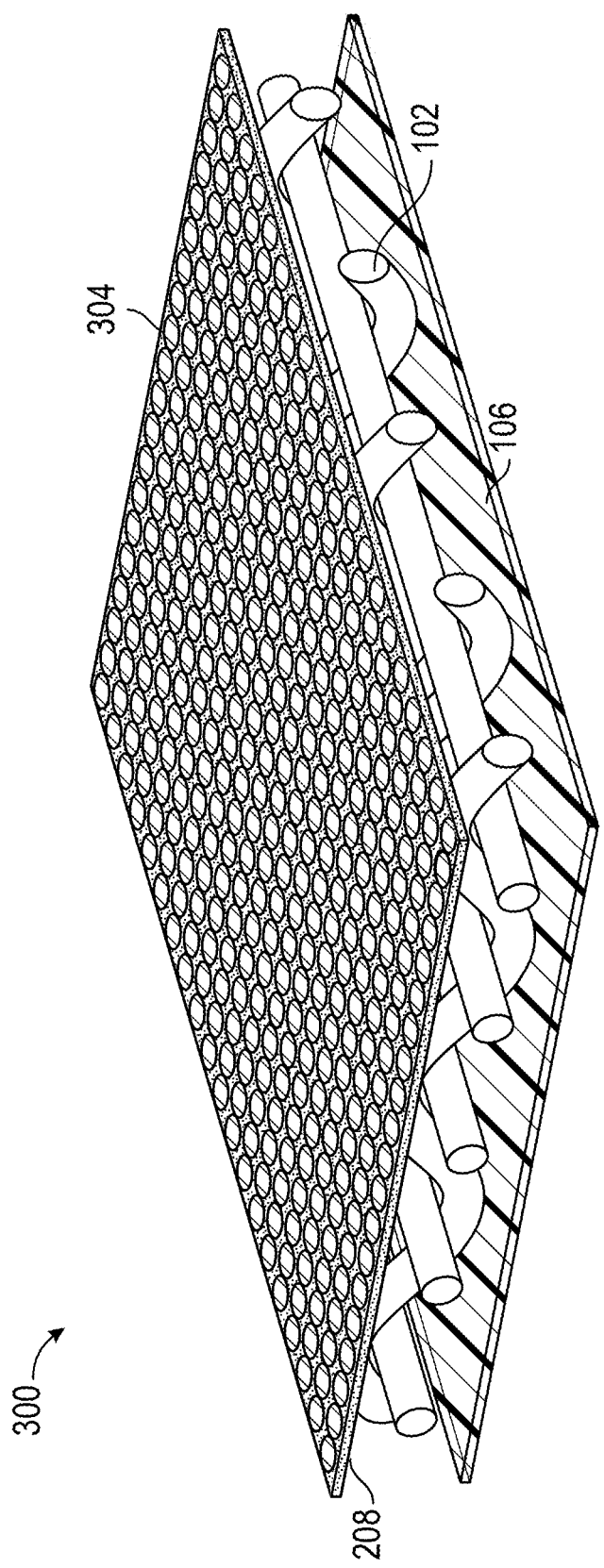
FIG. 3 is a cross-sectional view of a fabric or flexible composite material for an inflatable safety product according to certain embodiments of the present invention.
Figure 4:
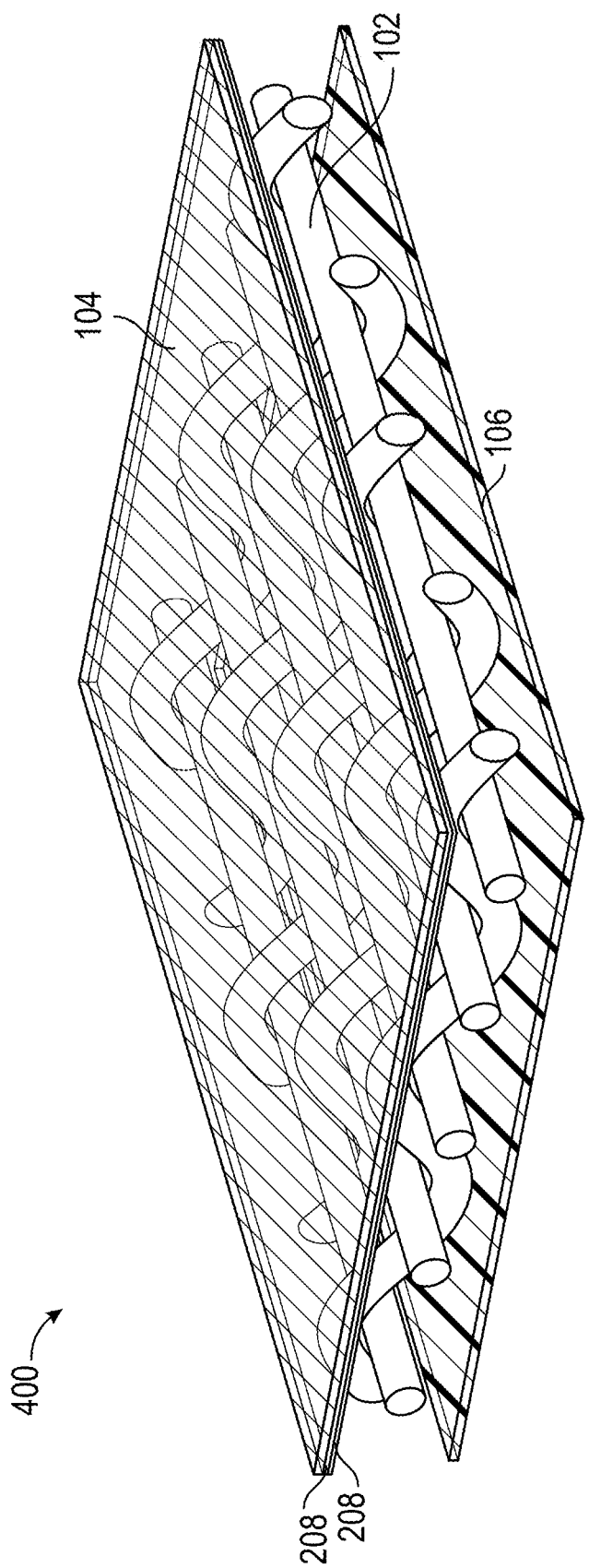
FIG. 4 is a cross-sectional view of a fabric or flexible composite material for an inflatable safety product according to certain embodiments of the present invention.

FIGS. 2-4, which are discussed in further detail below, illustrate additional examples of substrates 102 with additional layer(s). When included, various ones of the layers may form outermost layers of the fabric or flexible composite material, intermediate layers of the fabric or flexible composite material 100, and/or innermost layers of the fabric or flexible composite material 100.

When included, the metallic layer 104 may at least partially cover at least one of the surfaces of the low weight, high strength substrate 102. In some embodiments, the metallic layer 104 may be completely covering the at least one surface of the low weight, high strength substrate 102. Additionally, or alternatively, at least a portion of the low weight, high strength substrate 102 is not covered by the metallic layer 104. Additionally, or alternatively, the metallic layer 104 may be discontinuously covering the low weight, high strength substrate 102 and provided at discrete locations covering the low weight, high strength substrate 102. When the metallic layer 104 is included, an intermediate adhesive layer and/or film layer optionally may be provided between the low weight, high strength substrate 102 and the metallic layer 104.

The metallic layer 104 may include various metals or metallic elements as desired, including but not limited to aluminum, aluminum alloys, titanium, titanium alloys, nickel, nickel alloys brass, brass alloys, steel, steel alloys, stainless steel, stainless steel alloy, silver, silver alloy, combinations thereof, and/or any other suitable metal or metallic elements as desired. The metallic layer 104 optionally may be a continuous layer of the fabric or flexible composite material 100, meaning that the portions of the metallic layer 104 are interconnected even though an entirety of the at least one surface of the low weight, high strength substrate 102 is not necessarily covered.

The metallic layer 104 may be deposited, adhered, and/or otherwise positioned to cover at least one surface of the low weight, high strength substrate 102 (or intermediate adhesive layer and/or film layer) using various techniques as desired. As a non-limiting example, the metallic layer 104 may be printed on the low weight, high strength substrate 102 or intermediate adhesive layer and/or film layer, may be adhered to the low weight, high strength substrate 102 or intermediate adhesive layer and/or film layer via epoxies or other adhering materials, may be vapor-deposited on the low weight, high strength substrate 102 or intermediate adhesive layer and/or film layer, or the like. In some embodiments, the metallic layer 104 is plated on the low weight, high strength substrate 102 or intermediate adhesive layer and/or film layer, sputtered on the low weight, high strength substrate 102 or intermediate adhesive layer and/or film layer, or the like. In some embodiments, the metallic layer 104 is positioned on the low weight, high strength substrate 102, on other components of the fabric or flexible composite material 100, or on the fabric or flexible composite material 100 itself. In various embodiments, a metallic foil layer is adhered to the low weight, high strength substrate 102 or intermediate adhesive layer and/or film layer.

In some embodiments, when included, the metallic layer 104 may form an outermost layer and/or an innermost layer of the fabric or flexible composite material 100. However, in other embodiments, it need not be, and the metallic layer 104 may be covered by one or more exterior layers (and the exterior layer is an outer-most layer). When included, the exterior layer may be various types of materials as desired, and in certain embodiments the exterior layer may protect the metallic layer 104. In one non-limiting example, the exterior layer may be an acrylic coating, although in other embodiments other suitable materials may be utilized as desired. Optionally, and when included, the exterior layer may include a thin film layer, coating, or other suitable layer that may minimize and/or prevent damage, oxidation, and/or corrosion of the metallic layer 104. In some embodiments, the exterior layer optionally includes a passivation layer, a parkerized layer, or other suitable layer that may be formed via a controlled oxidation process. In another embodiment, the exterior layer may minimize or prevent deterioration of the fabric or flexible composite material due to hydrolysis. In another embodiment, the exterior layer may provide or improve a bonding surface of the fabric or flexible composite material.

In certain embodiments, the fabric or flexible composite material 100 has an improved emissivity compared to traditional materials. In various aspects, the metallic layer 104 reduces the emissivity of the fabric or flexible composite material 100 to less than or equal to 0.48, such as less than or equal to 0.25. In certain non-limiting examples, for low weight, high strength materials having a melting temperature greater than PE, the metallic layer 104 may be used to reduce the emissivity of the fabric or flexible composite material 100 to less than or equal to 0.48 (although lower emissivity values could be used), and for low weight, high strength materials with melting temperatures similar to and/or less than PE, the metallic layer 104 may be used to reduce the emissivity of the fabric or flexible composite material 100 to less than or equal to 0.25. The reduced emissivity in turn limits the temperature that the low weight, high strength substrate 102 (and other layers such as the inner layer 106) is heated to when the fabric or flexible composite material 100 is exposed to radiant heat. As a non-limiting example, the low weight, high strength substrate 102 may be an UHMWPE substrate, and the metallic layer 104 may limit the temperature the UHMWPE substrate to about 199° F., or about 98° F. less than the melting temperature of the UHMWPE substrate, when exposed to radiant heat flux of 1.5 Btu/ft$^2$-sec or greater, for at least 180 seconds.

In addition to reducing the emissivity of the fabric or flexible composite material 100, the metallic layer 104 may enhance other properties of the fabric or flexible composite material 100. The fabric or flexible composite material 100 may be a light-weight material for an inflatable safety product compared to traditional materials. The fabric or flexible composite material 100 may have improved abrasion resistance compared to traditional materials for inflatable safety products.

As illustrated in FIG. 1, another layer that may be provided with the low weight, high strength substrate 102 to form the fabric or flexible composite material 100 includes the inner layer 106. In one non-limiting example, when both the metallic layer 104 and the inner layer 106 are provided, the metallic layer 104 may be provided on a first surface (e.g., an outer surface) of the low weight, high strength substrate 102, and the inner layer 106 may be provided on a second surface (e.g., an inner surface) of the low weight, high strength substrate 102. When included, the inner layer 106 may provide an air-tight or gas-tight seal for the fabric or flexible composite material 100. The inner layer 106 may be constructed from various materials or combinations of materials as desired. As non-limiting examples, the inner layer 106 may be a plastic-based layer, a urethane-based layer, a metallic layer, combinations thereof, and/or any other suitable layer that can be positioned on the second surface of the low weight, high strength substrate 102 for allowing the fabric or flexible composite material 100 to be inflated with air or other gases.

FIGS. 2 and 4 illustrate other examples of a fabric or flexible composite materials with intermediate adhesive layers and/or film layers according to embodiments. The number of intermediate adhesive layers and/or film layers illustrated in FIGS. 2 and 4 is for illustrative purposes only and should not be considered limiting. In various embodiments, a fabric or flexible composite material according to embodiments may include an adhesive layer, a film layer, or both an adhesive layer and a film layer.

In FIG. 2, a fabric or flexible composite material 200 for an inflatable safety product is substantially similar to the fabric or flexible composite material 100 except that the fabric or flexible composite material additionally includes a layer 208 between the metallic layer 104 and the low weight, high strength substrate 102. The layer 208 in FIG. 2 may be an adhesive layer and/or film, and when included, may facilitate adhering of the metallic layer 104 to the low weight, high strength substrate 102. As a non-limiting example, the layer 208 may be deposited on, attached to, or otherwise positioned on the low weight, high strength substrate 102, and the metallic layer 104 may be deposited on, plated on, sputtered on, attached to, or otherwise positioned on the intermediate layer 208.

In FIG. 4, a fabric or flexible composite material 400 for an inflatable safety product is substantially similar to the fabric or flexible composite material 200 except that the fabric or flexible composite material 400 includes two layers 208 between the metallic layer 104 and the low weight, high strength substrate 102. In FIG. 4, each layer 208 may be an adhesive layer, a coating, a film layer, or both. The layers 208 in FIG. 4 may facilitate adhering of the metallic layer 104 to the low weight, high strength substrate 102.

FIG. 3 illustrates another example of a fabric or flexible composite material 300 for an inflatable safety product according to embodiments. The fabric or flexible composite material 300 is substantially similar to the fabric or flexible composite material 100 except that, whereas the metallic layer 104 is a connected surface and substantially covers the low weight, high strength substrate 102 or layer(s) 208, the metallic layer 304 of the fabric or flexible composite material 300 does not completely cover the low weight, high strength substrate 102 or layer(s) 208. The metallic layer 304 may be completely covering or discontinuous on the low weight, high strength substrate 102 or layer(s) 208 as desired.

In various embodiments, and as illustrated in FIG. 3, the metallic layer 304 may be provided as a discrete pattern covering on the low weight, high strength substrate 102 or layer(s) 208. In other embodiments, the metallic layer 304 need not form a pattern, and/or the metallic layer 304 may be provided as a plurality of discrete patterns (that may be connected with each other and/or disconnected). The uncovered portions of the low weight, high strength substrate 102 or layer(s) 208 of the fabric or flexible composite material 300 may allow for an adhesive and/or other material to be provided and directly engage the low weight, high strength substrate 102 202 or layer(s) 208 (e.g., when joining two fabrics or flexible composite materials and/or a component) while maintaining the improved performance of the metallic layer 304.

Various other fabric or flexible composite materials with low weight, high strength substrates 102 may be utilized for inflatable safety products as desired, and the aforementioned examples should not be considered limiting.

In certain embodiments, the fabric or flexible composite materials with the low weight, high strength substrate 102 may maintain the mechanical and/or gas-holding properties of the fabric or flexible composite material. The fabric or flexible composite material described herein may be used as a seam tape, patch material, component, or accessory, and the seam tape, patch material, component material or accessory material may maintain adhesion and/or gas-holding properties of the seam tape, patch material, component material, or accessory material when exposed to radiant heat during an aircraft fire without requiring a reflective paint coating on the seam tape, patch material, component material, or accessory material (as traditionally required for seam tapes, patch materials, component materials, or accessory materials).

FAA Requirements

In various embodiments, the fabric or flexible composite material described herein may meet and/or exceeds the fabric or flexible composite material requirements according to TSO-C69c from the Federal Aviation Administration (FAA), entitled EMERGENCY EVACUATION SLIDES, RAMPS, RAMP/SLIDES, AND SLIDE RAFTS and published Aug. 18, 1999 ("TSO-C69c") (incorporated herein by reference), TSO-C13f from the FAA, entitled LIFE PRESERVERS and published Sep. 24, 1992 ("TSO-C13f") (incorporated herein by reference), and/or TSO-C70b from the FAA, entitled LIFE RAFTS and published Aug. 4, 2014 ("TSO-C70b") (incorporated herein by reference).

Required tests include: seam peel strength, seam shear strength, tensile strength (grab test), tear strength (trapezoid test), tear strength (tongue test), ply adhesion, coat adhesion, temperature resistance, radiant heat resistance, puncture strength, tear propagation, chafe resistance, flammability (vertical burn rate), pressure retention, permeability, porosity (hydrolysis), hydrolysis conditioning, resistance to hydrolysis, fluids exposure, and accelerated aging.

Seam Adhesion

TSO-C69c Requirement

As a non-limiting example, the fabric or flexible composite material adhered or welded to the fabric or flexible composite material of the inflatable safety product creating a seam region, when separated from the fabric or flexible composite material of the inflatable safety product, at or about a 1800 angle, at a separation rate of between 2 and 2.5 inches/minute, at a temperature between 70° F. to 72° F., wherein the average of at least 5 specimens must resist separation with a force of 5 pounds/inch width or greater. The aforementioned resistance to separation, described herein peel strength as referenced in TSOs, such as but not limited to TSO-C69c from the FAA.

As a further non-limiting example, any coatings, films, or layers applied to the substrate of the fabric or flexible composite material, when separated from the substrate or other layers used in the construction of the fabric or flexible composite material, of the inflatable safety product, at or about a 180° angle, at a separation rate of between 2 and 2.5 inches/minute, at a temperature of between 70° F. to 72° F., wherein the average of at least 5 specimens must resist separation with a force of 5 pounds/inch width or greater. The aforementioned resistance to separation, described herein ply adhesion and coating adhesion as referenced in TSOs, such as but not limited to TSO-C69c from the FAA.

Seam Shear

TSO-C69c Requirement

As a non-limiting example, the fabric or flexible composite material adhered or welded to the fabric or flexible composite material of the inflatable safety product creating a seam region, when used to create a specimen of the seam region and with the fabric or flexible composite material adhered or welded with a ¾ inch maximum overlap, at a separation rate between 11.5 and 12.5 inches/minute, at a temperature of 75° F., wherein the average of at least 3 specimens must resist separation with a force of 175 pounds/inch width or greater when pulled in the shear direction.

As a further non-limiting example, the fabric or flexible composite material adhered or welded to the fabric or flexible composite material of the inflatable safety product creating a seam region, when used to create a specimen of seam region 2 inches in length and with the fabric or flexible composite material adhered or welded at a ¾ inch maximum overlap, at a separation rate of between 11.5 and 12.5 inches/minute, at a temperature of 140° F., wherein the average of at least 3 specimens must resist separation with a force of 40 pounds/inch width or greater when the pulled in the shear direction. The aforementioned resistance to separation, describes shear strength as referenced in TSOs, such as but not limited to TSO-C69c from the FAA.

Tensile and Tear Strength

TSO-C69c Requirement

As a non-limiting example, the fabric or flexible composite material of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging (exposed to a temperature of 158±4° F. for not less than 168 hours), the fabric or flexible composite of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must resist separation with a maximum force of an average of at least 190 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must a resist separation with a maximum force of an average of at least 190 pounds/inch in warp direction and fill direction (along the manufacturing length and width of the fabric or flexible composite material).

Air Holding & Gas Holding

TSO-C69c Requirement

As a non-limiting example, the fabric or flexible composite material, described herein when configured into an inflatable safety product must withstand a pressure of at least 1.5 times the maximum operating pressure for at least 5 minutes of its intended use.

As a further non-limiting example, the fabric or flexible composite material, described herein when configured into an inflatable safety product must withstand a pressure of at least 2 times the maximum operating pressure for at least 1 minute, of its intended use.

As a further non-limiting example, the fabric or flexible composite material, described herein when configured into an inflatable safety inflatable safety product, when inflated to its operating pressure of intended use must not fall below at least 50 percent of its initial pressure in a period less than 12 hours.

As a further non-limiting example, the fabric or flexible composite material, described herein when configured into an inflatable safety product, that is capable of being used as a life raft or flotation device when inflated to its operating pressure of intended use must not fall below the minimum raft mode operating pressure in less than 24 hours.

Helium Permeability

TSO-C69c Requirement

As a non-limiting example, the fabric or flexible composite material of the inflatable safety product, when at least 3 specimens are prepared and tested as per Federal Test Method Standard—Method 5460 or ASTM Method D1434-82, Procedure V, have a maximum permeability of Helium of 10 liters per square meter in 24 hours at 77° F. or its equivalent in Hydrogen when a pressure is applied to the chamber on the side of the test specimen that separates the test gas (Helium or its equivalent in Hydrogen) from the chamber receiving the permeating gas.

Temperature Resistance
TSO-C69c Requirement:

As a non-limiting example, the fabric or flexible composite material, seam tape, accessory material and or product accessories described herein when exposed to temperatures from −40° F. to 160° F. must remain fully functioning per its intended use as referenced in TSOs, such as but not limited to TSO-C69c from the FAA.

As a further non-limiting example, the fabric or flexible composite material, seam tape, accessory material and or product accessories described herein must remain fully functioning per its intended use after exposure to a storage temperature of 185° F. or greater as referenced in TSOs, such as but not limited to TSO-C69c from the FAA.

As a further non-limiting example, the fabric or flexible composite material, seam tape, accessory material and or product accessories described herein must remain fully functioning per its intended use after being stowed at a temperature −65° F. or less as referenced in TSOs, such as but not limited to TSO-C69c from the FAA.

Radiant Heat Resistance
TSO-C69c Requirement

As a further non-limiting example, the fabric or flexible composite material described herein when exposed to a radiant heat flux of 1.5 Btu/ft$^2$-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Fluids Exposure
TSO-C70b Requirement

As a further non-limiting example, the fabric or flexible composite material described herein must be capable of withstanding the detrimental effects of exposure to fuels, oils, hydraulic fluids, and sea water. After being exposed to fuels, oils, hydraulic fluids, and sea water, a seam will not have a decrease in seam strength or coat adhesion of more than 10%.

As a further non-limiting example, the fabric or flexible composite material, described herein must remain capable of withstanding the detrimental effects of exposure to fuels, oils, hydraulic fluids, and sea water with no loss in air holding or gas holding properties. After being exposed to fuels, oils, hydraulic fluids, and sea water, the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C70b from the FAA.

Hydrolysis
TSO-C69c Requirement

As a further non-limiting example, the fabric or flexible composite material, described herein must remain capable of withstanding the detrimental effects of hydrolysis exposure to a temperature of 136±4° F. at a relative humidity of 95±4 percent for a period of 50 days with no loss in air holding or gas holding properties. After hydrolysis exposure to a temperature of 136±4° F. at a relative humidity of 95±4 percent for a period of 50 days the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 20% as referenced in TSOs, such as but not limited to TSO-C69c from the FAA.

Tear Propagation
TSO-C69c Requirement

As a non-limiting example, the fabric or flexible composite material, described herein when must not allow a tear to propagate beyond the implement that caused an initial puncture or tear as referenced in TSOs, such as but not limited to TSO-C69c from the FAA.

Accelerated Aging
TSO-C69c Requirement

As a further non-limiting example, the fabric or flexible composite material, described herein must remain capable of withstanding the detrimental effects of accelerated aging at a temperature of 158±4° F. for not less than 168 hours with no loss in air holding or gas holding properties. After accelerated aging at a temperature of 158±4° F. for not less than 168 hours the fabric or flexible composite material, seam tape, accessory material wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C69c from the FAA.

Flammability
TSO-C69c Requirement

As a non-limiting example, the fabric or flexible composite material, described herein, wherein the average of at least 3 specimens in warp direction and fill direction (along the manufacturing length and width of the fabric or flexible composite material material) are located ¾ inches above the top edge of a burner apparatus, for a period of 12 seconds is exposed to a flame with a total length of 1.5 inches and an inner cone length of ⅞ inches, and minimum temperature of 1550° F., shall not burn for more than 15 seconds after the flame is removed, shall not burn more than 8 inches in the vertical direction, wherein any material that drips form the specimen shall not burn to more than 5 seconds, as referenced such as but not limited to the flammability requirements of 14 CFR part 25.853(a), Appendix F, Part I (a)(1)(ii) as referenced in TSOs, such as but not limited to TSO-C69c from the FAA.

EXAMPLES

A collection of exemplary embodiments is provided below, including at least some explicitly enumerated as "Examples" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Example 1. A fabric or flexible composite material for an inflatable safety product, the fabric or flexible composite material comprising a low weight, high strength substrate comprising a tensile strength of at least 190 lbs/in and a tear strength of at least 13 lbs/in and a substrate weight of less than or equal to 3 ounces/yd$^2$.

Example 2. The fabric or flexible composite material of the preceding or subsequent examples or combinations of examples, wherein the fabric or flexible composite material comprises a fabric or flexible composite material weight less than or equal to 8 ounces/yd$^2$.

Example 3. The fabric or flexible composite material of the preceding or subsequent examples or combinations of examples, wherein the fabric or flexible composite material comprises a fabric or flexible composite material weight less than or equal to 5 ounces/yd$^2$.

Example 4. The fabric or flexible composite material of the preceding or subsequent examples or combinations of examples, wherein the fabric or flexible composite material comprises a fabric or flexible composite material weight less than or equal to 4 ounces/yd$^2$.

Example 5. The fabric or flexible composite material of the preceding or subsequent examples or combinations of examples, wherein the fabric or flexible composite material weight is less than or equal to 2 ounces/yd$^2$.

Example 6. The fabric or flexible composite material of the preceding or subsequent examples or combinations of examples, wherein the fabric or flexible composite material weight is less than or equal to 1 ounce/yd$^2$.

Example 7. The fabric or flexible composite material of the preceding or subsequent examples or combinations of examples, wherein the fabric or flexible composite material comprises an emissivity value of 0.48 or less.

Example 8. The fabric or flexible composite material of the preceding or subsequent examples or combinations of examples, wherein the fabric or flexible composite material comprises an emissivity value of 0.25 or less.

Example 9. The fabric or flexible composite material of the preceding or subsequent examples or combinations of examples, wherein the low weight, high strength substrate defines a surface, and wherein the fabric or flexible composite material further comprises a metallic layer at least partially covering the surface.

Example 10. The fabric or flexible composite material of the preceding or subsequent examples or combinations of examples, wherein the metallic layer completely covers the surface.

Example 11. The fabric or flexible composite material of the preceding or subsequent examples or combinations of examples, wherein at least a portion of the low weight, high strength fabric or flexible composite material is not covered by the metallic layer.

Example 12. The fabric or flexible composite material of the preceding or subsequent examples or combinations of examples, wherein the metallic layer comprises aluminum, an aluminum alloy, titanium, a titanium alloy, nickel, a nickel alloy, brass, a brass alloy, steel, a steel alloy, stainless steel or a stainless steel alloy, silver, a silver alloy, combinations thereof, or any other suitable metal or metallic alloy.

Example 13. The fabric or flexible composite material of the preceding or subsequent examples or combinations of examples, wherein the fabric or flexible composite material comprises a radiant heat resistance of at least 180 seconds, when exposed to radiant heat flux of 1.5 Btu/ft$^2$-sec or greater, for at least 180 seconds.

Example 14. The fabric or flexible composite material of the preceding or subsequent examples or combinations of examples, wherein the low weight, high strength substrate is selected from the group consisting of a PE, UHMWPE, PP, polyester, PA, aromatic polyamide, aramid, polyolefin, aromatic polyester, polyarylate, other liquid crystal polymers, or nylon.

Example 15. The fabric or flexible composite material of the preceding or subsequent examples or combinations of examples, wherein the fabric or flexible composite material is a gas-holding or air-holding fabric or flexible composite material, floor fabric or flexible composite material, a sliding surface fabric or flexible composite material, a girt fabric or flexible composite material, patch fabric or flexible composite material, an accessory fabric or flexible composite material, component fabric or flexible composite material, or a seam tape fabric or flexible composite material.

Example 16. The fabric or flexible composite material of the preceding or subsequent examples or combinations of examples, wherein the low weight, high strength comprises a material with a melting point less than 300 degrees Fahrenheit.

Example 17. The fabric or flexible composite material of the preceding or subsequent examples or combinations of examples, wherein the low weight, high strength comprises a material with a melting point less than or equal to 400 degrees Fahrenheit.

Example 18. An inflatable safety product comprising the fabric or flexible composite material of the preceding or subsequent examples or combinations of examples as a panel, floor, sliding surface, girt, patch, handle, structural attachment, pouch, accessory, component or as a seam tape.

Example 19. The inflatable safety product of the preceding or subsequent examples or combinations of examples, wherein the inflatable safety product comprises at least one of evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety devices.

Example 20. A fabric or flexible composite material for an inflatable safety product, the fabric or flexible composite material comprising a low weight, high strength substrate comprising a tensile strength of at least 190 lbs/in and a substrate weight of less than or equal to 3 ounces/yd$^2$.

Example 21. The fabric or flexible composite material of the preceding or subsequent examples or combinations of examples, wherein the fabric or flexible composite material comprises a fabric or flexible composite material weight less than or equal to 8 ounces/yd$^2$.

Example 22. The fabric or flexible composite material of the preceding or subsequent examples or combinations of examples, wherein the fabric or flexible composite material comprises a fabric or flexible composite material weight less than or equal to 5 ounces/yd$^2$.

Example 23. The fabric or flexible composite material of the preceding or subsequent examples or combinations of examples, wherein the fabric or flexible composite material comprises a fabric or flexible composite material weight less than or equal to 4 ounces/yd$^2$.

Example 24. The fabric or flexible composite material of the preceding or subsequent examples or combinations of examples, wherein the fabric or flexible composite material weight is less than or equal to 2 ounces/yd$^2$.

Example 25. The fabric or flexible composite material of the preceding or subsequent examples or combinations of examples, wherein the fabric or flexible composite material weight is less than or equal to 1 ounce/yd$^2$.

Example 26. The fabric or flexible composite material of the preceding or subsequent examples or combinations of examples, wherein the low weight, high strength substrate is selected from the group consisting of PE, UHMWPE, PP, polyester, PA, aromatic polyamide, aramid, polyolefin, aromatic polyester, polyarylate, other liquid crystal polymers, or nylon.

Example 27. A fabric or flexible composite material for an inflatable safety product, the fabric or flexible composite material comprising a low weight, high strength substrate comprising a tear strength of at least 13 lbs/in and a substrate weight of less than or equal to 3 ounces/yd$^2$.

Example 28. The fabric or flexible composite material of the preceding or subsequent examples or combinations of examples, wherein the low weight, high strength substrate is selected from the group consisting of PE, UHMWPE, PP, polyester, PA, aromatic polyamide, aramid, polyolefin, aromatic polyester, polyarylate, other liquid crystal polymers, or nylon.

Example 29. A fabric or flexible composite material for an inflatable safety product, the fabric or flexible composite material comprising a low weight, high strength substrate comprising a substrate weight of less than or equal to 3 ounces/yd$^2$, wherein the fabric or flexible composite material comprises a radiant heat resistance of at least 180 seconds, when exposed to radiant heat flux of 1.5 Btu/ft$^2$-sec or greater, for at least 180 seconds.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. A fabric or flexible composite material for an inflatable safety product, the fabric or flexible composite material comprising a low weight, high strength substrate comprising a plurality of ultra-high molecular weight polyethylene fibers, wherein the substrate comprises a weight of 1 ounces/yd$^2$, wherein the fabric or flexible composite material comprises a tensile strength of at least 190 lbs/in and a tear strength of at least 13 lbs/in and a weight of the fabric or flexible composite material less than or equal to 4 ounces/yd$^2$.

2. The fabric or flexible composite material of claim 1, wherein the fabric or flexible composite material comprises an emissivity value of 0.48 or less.

3. The fabric or flexible composite material of claim 1, wherein the fabric or flexible composite material comprises an emissivity value of 0.25 or less.

4. The fabric or flexible composite material of claim 1, wherein the low weight, high strength substrate defines a surface, and wherein the fabric or flexible composite material further comprises a metallic layer at least partially covering the surface.

5. The fabric or flexible composite material of claim 4, wherein the metallic layer completely covers the surface.

6. The fabric or flexible composite material of claim 4, wherein at least a portion of the low weight, high strength substrate is not covered by the metallic layer.

7. The fabric or flexible composite material of claim 4, wherein the metallic layer comprises aluminum, an aluminum alloy, titanium, a titanium alloy, nickel, a nickel alloy, brass, a brass alloy, steel, a steel alloy, stainless steel or a stainless steel alloy, silver, a silver alloy, combinations thereof, or any other suitable metal or metallic alloy.

8. The fabric or flexible composite material of claim 1, wherein the fabric or flexible composite material comprises a radiant heat resistance of at least 180 seconds, when exposed to radiant heat flux of 1.5 Btu/ft²-sec or greater, for at least 180 seconds.

9. An inflatable safety product comprising the fabric or flexible composite material of claim 1 as a gas-holding or air-holding fabric or flexible composite material, floor fabric or flexible composite material, a sliding surface fabric or flexible composite material, a girt fabric or flexible composite material, patch fabric or flexible composite material, an accessory fabric or flexible composite material, component fabric or flexible composite material, or a seam tape fabric or flexible composite material.

10. An inflatable safety product comprising the fabric or flexible composite material of claim 1 as a panel, floor, sliding surface, girt, patch, handle, structural attachment, pouch, accessory, component or as a seam tape.

11. The inflatable safety product of claim 10, wherein the inflatable safety product comprises at least one of evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety devices.

12. A fabric or flexible composite material for an inflatable safety product, the fabric or flexible composite material comprising a low weight, high strength substrate comprising a plurality of fibers, wherein a material of the plurality of fibers comprises a melting temperature less than 400° F., wherein the substrate comprises a weight of less than or equal to 1 ounces/yd², wherein a weight of the fabric or flexible composite material is less than or equal to 4 ounces/yd², and wherein the fabric or flexible composite material comprises tensile strength of at least 190 lbs/in.

13. The fabric or flexible composite material of claim 12, wherein the low weight, high strength substrate is selected from the group consisting of polyethylene, ultra-high molecular weight polyethylene, polypropylene, polyester, polyamide, aromatic polyamide, aramid, polyolefin, aromatic polyester, polyarylate, other liquid crystal polymers, or nylon.

14. A fabric or flexible composite material for an inflatable safety product, the fabric or flexible composite material comprising:
a low weight, high strength substrate comprising a tear strength of at least 13 lbs/in and a substrate weight of less than or equal to 1 ounces/yd², wherein the low weight, high strength substrate comprises an inner surface and an outer surface;
a continuous metallic layer extending over at least a portion of the outer surface of the low weight, high strength substrate; and
an intermediate layer between the continuous metallic layer and the low weight, high strength substrate, wherein the intermediate layer adheres the continuous metallic layer to the outer surface.

15. The fabric or flexible composite material of claim 14, wherein the low weight, high strength substrate is selected from the group consisting of polyethylene, ultra-high molecular weight polyethylene, polypropylene, polyester, polyamide, aromatic polyamide, aramid, polyolefin, aromatic polyester, or polyarylate.

16. A fabric or flexible composite material for an inflatable safety product, the fabric or flexible composite material comprising:
a low weight, high strength substrate comprising at least one surface; and
a metallic layer on the at least one surface of the low weight, high strength substrate, wherein the metallic layer is provided as a discrete pattern on the at least one surface, the discrete pattern defining a plurality of covered portions on the at least one surface and a plurality of uncovered portions on the at least one surface, and wherein the plurality of connected portions are connected with each other; and
a substrate weight of less than or equal to 1 ounces/yd², wherein the fabric or flexible composite material comprises a radiant heat resistance of at least 180 seconds, when exposed to radiant heat flux of 1.5 Btu/ft²-sec or greater, for at least 180 seconds.

* * * * *